(12) United States Patent
Roman et al.

(10) Patent No.: US 9,986,424 B1
(45) Date of Patent: May 29, 2018

(54) ASSISTANT FOR MANAGEMENT OF NETWORK DEVICES

(71) Applicant: Essential Products, Inc., Palo Alto, CA (US)

(72) Inventors: Manuel Roman, Sunnyvale, CA (US); Mara Clair Segal, San Francisco, CA (US); Dwipal Desai, Palo Alto, CA (US); Andrew E. Rubin, Los Altos, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days. days.

(21) Appl. No.: 15/587,253

(22) Filed: May 4, 2017

Related U.S. Application Data (60) Provisional application No. 62/446,498, filed on Jan. 15, 2017, provisional application No. 62/486,400, filed on Apr. 17, 2017, provisional application No. 62/486,404, filed on Apr. 17, 2017.

(51) Int. Cl.
| | |
|---|---|
| *G06F 15/173* | (2006.01) |
| *H04W 8/24* | (2009.01) |
| *H04W 4/00* | (2018.01) |
| *H04W 12/06* | (2009.01) |
| *H04W 84/12* | (2009.01) |
| *H04W 12/02* | (2009.01) |
| *H04W 12/08* | (2009.01) |

(52) U.S. Cl.
CPC ........... *H04W 8/245* (2013.01); *H04W 4/005* (2013.01); *H04W 12/06* (2013.01); *H04W 4/008* (2013.01); *H04W 12/02* (2013.01); *H04W 12/08* (2013.01); *H04W 84/12* (2013.01)

(58) Field of Classification Search
USPC ....... 709/203, 206, 217, 219, 223, 224, 226, 709/228, 231, 232, 238; 380/270; 463/40
See application file for complete search history.

(56) References Cited

U.S. PATENT DOCUMENTS

| | | | |
|---|---|---|---|
| 6,795,688 B1 | 9/2004 | Plasson et al. | |
| 7,826,408 B1 | 11/2010 | Vleugels et al. | |
| 8,156,388 B2 | 4/2012 | Herrod | |
| 8,838,095 B2 | 9/2014 | Jouin | |
| 8,903,377 B2 | 12/2014 | Jouin | |
| 9,462,566 B1 | 10/2016 | Koller et al. | |
| 2002/0174209 A1 | 11/2002 | Sesek et al. | |
| 2003/0041159 A1* | 2/2003 | Tinsley ................. | G06F 9/4443 709/231 |
| 2005/0182852 A1* | 8/2005 | Tinsley ................. | H04L 47/10 709/238 |
| 2005/0190755 A1 | 9/2005 | Singh et al. | |

(Continued)

OTHER PUBLICATIONS

International Search Report and Written Opinion dated Aug. 24, 2017 in International Application No. PCT/US17/35550, 10 pages.

(Continued)

*Primary Examiner* — Quang N Nguyen
(74) *Attorney, Agent, or Firm* — Perkins Coie LLP (57) ABSTRACT

Management of devices on a wireless network is described. An assistant device can determine that another device is missing configuration settings to use a wireless network. Using another wireless network employing a different protocol, the missing configuration settings can be provided.

16 Claims, 6 Drawing Sheets

(56) References Cited

U.S. PATENT DOCUMENTS

| | | |
|---|---|---|
| 2006/0215601 A1 | 9/2006 | Vleugels et al. |
| 2008/0205339 A1 | 8/2008 | Brophy et al. |
| 2008/0280588 A1 | 11/2008 | Roundtree et al. |
| 2009/0319765 A1 | 12/2009 | Fehrle |
| 2011/0292920 A1 | 12/2011 | Krieter |
| 2012/0071152 A1 | 3/2012 | Roundtree et al. |
| 2012/0124481 A1 | 5/2012 | Campbell et al. |
| 2012/0157209 A1 | 6/2012 | Yamashita et al. |
| 2013/0078994 A1 | 3/2013 | Jouin et al. |
| 2013/0081113 A1 | 3/2013 | Cherian et al. |
| 2013/0244784 A1* | 9/2013 | Assa ............... G06F 3/0488 463/40 |
| 2013/0318343 A1 | 11/2013 | Bjarnason et al. |
| 2014/0050319 A1* | 2/2014 | Pang ............... H04W 48/20 380/270 |
| 2014/0122862 A1 | 5/2014 | Ludwig et al. |
| 2014/0187200 A1 | 7/2014 | Reitter et al. |
| 2014/0248864 A1 | 9/2014 | Rangarajan et al. |
| 2015/0058952 A1 | 2/2015 | Os et al. |
| 2016/0150576 A1 | 5/2016 | Moisio et al. |
| 2017/0249574 A1 | 8/2017 | Knijnik |

OTHER PUBLICATIONS

International Search Report and Written Opinion dated Oct. 20, 2017 in International Application No. PCT/US2017/035549, 16 pages.

Non-Final Office Action dated Sep. 14, 2017 for U.S. Appl. No. 15/587,263, of Roman, M., filed May 4, 2017.

Notice of Allowance dated Nov. 7, 2017 for U.S. Appl. No. 15/622,740, of Roman, M., filed Jun. 14, 2017.

U.S. Appl. No. 15/587,263 of Roman, M., filed May 4, 2017.

U.S. Appl. No. 15/622,740 of Roman, M., filed Jun. 14, 2017.

\* cited by examiner

ASSISTANT FOR MANAGEMENT OF NETWORK DEVICES

CLAIM FOR PRIORITY

This application claims priority to U.S. Provisional Patent Application No. 62/446,498, entitled "Assistant for Management of Network Devices," by Roman et al., and filed on Jan. 15, 2017. This application also claims priority to U.S. Provisional Patent Application No. 62/486,400, entitled "Assistant for Management of Network Devices," by Roman, and filed on Apr. 17, 2017. This application also claims priority to U.S. Provisional Patent Application No. 62/486,404, entitled "Management of Network Devices Based on Characteristics," by Roman, and filed on Apr. 17, 2017. The content of the above-identified applications are incorporated herein by reference in their entirety.

TECHNICAL FIELD

This disclosure relates to wireless networks, and in particular an assistant device and techniques for installing and managing network devices on a wireless network.

BACKGROUND

The Internet of Things (IoT) allows for the internetworking of devices to exchange data among themselves to enable sophisticated functionality. For example, devices configured for home automation can exchange data to allow for the control and automation of lighting, air conditioning systems, security, etc. However, as more devices include network connectivity, the demands on wireless networks can increase as the amount of data exchanged among the devices increases. In the smart home environment, this can also lead to an increase in the number of devices that need to connect to the home's wireless network. Setting up a vast number of devices on the wireless network can be a difficult and laborious process. Additionally, devices can often lose their configuration settings and, therefore, need to be set up again to connect to the home's wireless network.

SUMMARY

Some of the subject matter described herein includes an electronic device, including: one or more processors; and memory storing instructions, wherein the processor is configured to execute the instructions such that the processor and memory are configured to: determine that a device is missing configuration settings to use a first wireless network implemented using a first protocol, the determination based on communicating with the first device using a second wireless network implemented using a second protocol, the first protocol being a wireless local area network (WLAN) protocol, the second protocol being a personal area network (PAN) protocol; determine the configuration settings for the device to use the first wireless network, the configuration settings including authentication credentials of the first wireless network; and provide the configuration settings including the authentication credentials to the first wireless network implemented using the WLAN protocol to the device using the second wireless network implemented using the PAN protocol.

Some of the subject matter described herein also includes an electronic device, including: one or more processors; and memory storing instructions, wherein the processor is configured to execute the instructions such that the processor and memory are configured to: determine that a first device is missing configuration settings to use a first wireless network implemented using a first protocol, the determination based on communicating with the first device using a second wireless network implemented using a second protocol, the first protocol and the second protocol being different; determine the configuration settings for the first device to use the first wireless network; and provide the configuration settings regarding the first wireless network implemented using the first protocol to the first device using the second wireless network implemented using the second protocol.

In some implementations, one of the first protocol or the second protocol is a wireless local area network (WLAN) protocol, and the other is a personal area network (PAN) protocol.

In some implementations, the first protocol is the WLAN protocol, and the second protocol is the PAN protocol.

In some implementations, the configuration settings include authentication credentials of the first wireless network.

In some implementations, the second wireless network is provided by the first device, a range of the second wireless network being smaller than a range of the first wireless network.

In some implementations, the processor is configured to execute the instructions such that the processor and memory are configured to: receive an image frame portraying the device, wherein the determination that the device is missing configuration settings is based on the device being portrayed in the image frame.

In some implementations, the processor is configured to execute the instructions such that the processor and memory are configured to: determine first characteristics representative of the first device; determine second characteristics representative of a second device, the first characteristics and the second characteristics being different; and provide different configuration settings to the second device than the configuration settings provided to the first device based on the differences between the first characteristics and the second characteristics.

Some of the subject matter described herein also includes a method for managing devices on a wireless network, including: determining, by a processor, that a first device is missing configuration settings to use a first wireless network implemented using a first protocol, the determination based on communicating with the first device using a second wireless network implemented using a second protocol, the first protocol and the second protocol being different; determining the configuration settings for the first device to use the first wireless network; and providing the configuration settings regarding the first wireless network implemented using the first protocol to the first device using the second wireless network implemented using the second protocol.

In some implementations, one of the first protocol or the second protocol is a wireless local area network (WLAN) protocol, and the other is a personal area network (PAN) protocol.

In some implementations, the first protocol is the WLAN protocol, and the second protocol is the PAN protocol.

In some implementations, the configuration settings include authentication credentials of the first wireless network.

In some implementations, the second wireless network is provided by the first device, a range of the second wireless network being smaller than a range of the first wireless network.

In some implementations, the processor is configured to execute the instructions such that the processor and memory are configured to: receive an image frame portraying the device, wherein the determination that the device is missing configuration settings is based on the device being portrayed in the image frame.

In some implementations, the processor is configured to execute the instructions such that the processor and memory are configured to: determine first characteristics representative of the first device; determine second characteristics representative of a second device, the first characteristics and the second characteristics being different; and provide different configuration settings to the second device than the configuration settings provided to the first device based on the differences between the first characteristics and the second characteristics.

Some of the subject matter described herein also includes a computer program product, comprising one or more non-transitory computer-readable media having computer program instructions stored therein, the computer program instructions being configured such that, when executed by one or more computing devices, the computer program instructions cause the one or more computing devices to: determine that a first device is missing configuration settings to use a first wireless network implemented using a first protocol, the determination based on communicating with the first device using a second wireless network implemented using a second protocol, the first protocol and the second protocol being different; determine the configuration information for the first device to use the first wireless network; and provide the configuration settings regarding the first wireless network implemented using the first protocol to the first device using the second wireless network implemented using the second protocol.

In some implementations, one of the first protocol or the second protocol is a wireless local area network (WLAN) protocol, and the other is a personal area network (PAN) protocol.

In some implementations, the first protocol is the WLAN protocol, and the second protocol is the PAN protocol.

In some implementations, the configuration settings includes authentication credentials of the first wireless network.

In some implementations, the second wireless network is provided by the first device, a range of the second wireless network being smaller than a range of the first wireless network.

In some implementations, the computer program instructions cause the one or more computing devices to receive an image frame portraying the device, wherein the determination that the device is missing configuration settings is based on the device being portrayed in the image frame.

In some implementations, the computer program instructions cause the one or more computing devices to determine first characteristics representative of the first device; determine second characteristics representative of a second device, the first characteristics and the second characteristics being different; and provide different configuration settings to the second device than the configuration settings provided to the first device based on the differences between the first characteristics and the second characteristics.

DETAILED DESCRIPTION

This disclosure describes devices and techniques for setting up and managing devices on a wireless network. In one example, an assistant device (e.g., implemented by a smartphone) can store information regarding the devices set up on a home's wireless network. That stored information can include configuration settings for some of those devices, such as the credentials for the home's wireless network (e.g., the name or service set identifier (SSID) of the wireless network, password to connect with the wireless network providing access to the Internet, etc.) as provided by a router and/or access point. If a new device needs to be set up on the home's wireless network, the assistant device can determine the configuration settings that it needs and provide those configuration settings to the new device so that it can connect to the home's wireless network. For example, the assistant device can communicate with the new device using a communications channel (e.g., using a wireless standard implementing a personal area network (PAN) such as Bluetooth®) and provide the wireless network credentials. Because the new device is provided the wireless network credentials, it can then connect with the wireless network using another communications channel (e.g., using one of the Institute of Electrical and Electronics Engineers (IEEE) 802.11 standards implementing a wireless local area network (WLAN)). As a result, the new device can be installed onto the home's wireless network without much involvement of its owner or user.

In another example, devices sometimes lose their configuration settings and need to be reconfigured to connect with the home's wireless network. The assistant device can determine if devices are off the wireless network, and if so, provide the proper configuration information so that the devices can easily reconnect to the wireless network. This can also result in little involvement of the owner, and therefore, devices can be configured to reconnect with the home's wireless network so that that the owner's home experience appears to be without interruption.

Figure 1:
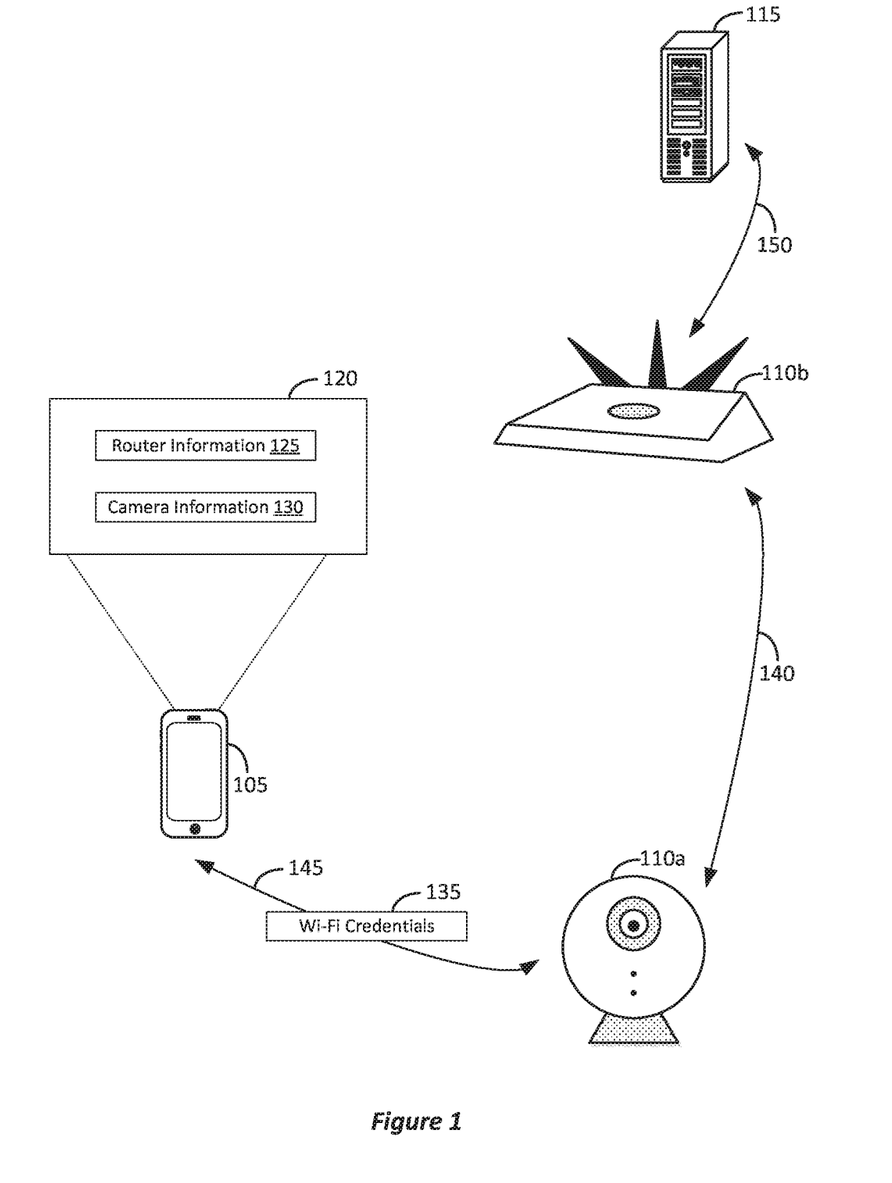
FIG. 1 illustrates an example of an assistant device for managing network devices.

In more detail, FIG. 1 illustrates an example of an assistant device for managing network devices. In FIG. 1, assistant device 105 stores configuration information 120 including data regarding devices such as router 110b. The configuration information can include data such as the configuration settings that other devices need to be able to access the resources of the corresponding devices in the home. For example, router 110b can provide a wireless network providing a WLAN under the IEEE 802.11 standards. Devices connecting to that wireless network can then access other devices within the wireless network as well as provide information to router 110b to be transmitted 150 to an Internet server 115 (i.e., to a device of another network).

In some implementations, when assistant device 105 initially connects with the wireless network provided by router 110b, it can store the wireless network credentials as router information 125. That is, the configuration settings (such as the SSID and password) that other devices would need to be able to access the wireless network provided by router 110b can be stored by the assistant device as router information 125.

In FIG. 1, camera 110a can be a new device to set up on the wireless network and, therefore, it needs the credentials of the wireless network. In some scenarios, the owner or user of camera 110a may set up camera 110a manually, for example, by using software associated with camera 110a to select the proper wireless network and manually type in its password so that it can properly connect to the home's wireless network. Unfortunately, this can be a complicated and time-intensive process. However, with assistant device 105, router information 125 can be provided to camera 110a so that it can easily connect to the wireless network without much intervention from the user.

For example, camera 110a and assistant device 105 can communicate with each other over a wireless communication channel using a personal area network (PAN) standard (or protocol) such as Bluetooth®, ZigBee®, Z-Wave®, INSTEON®, IrDA®, Wireless USB®, etc. In contrast with a WLAN, a PAN can be a relatively shorter-distance or shorter-range wireless network. In some implementations, camera 110a set up the PAN and can broadcast a message to assistant device 105 that it needs the credentials to the WLAN wireless network using the PAN. As a result, when assistant device 105 comes into a close enough proximity with camera 110a and is able to connect to the PAN upon being within range, it may detect a signal using the PAN wireless communication standard indicating that camera 110a needs the WLAN credentials to set up on the home's wireless network. In some implementations, assistant device 105 may initiate the initial communications with camera 110a.

Upon determining that camera 110a needs configuration settings for the WLAN, assistant device 105 can determine the specific configuration settings that camera 110a needs, look up that information in configuration information 120, and provide the corresponding configuration settings to camera 110a. For example, camera 110a may provide a request for configuration settings indicating that it needs the SSID and password of the home's wireless network (i.e., the wireless network implemented using the WLAN). Assistant device 105 can receive the request data (e.g., over the wireless communication channel corresponding to the PAN) and provide the requested configuration settings (also using the PAN). For example, in FIG. 1, camera 110a has requested the wireless credentials of the home's wireless network. That is, camera 110a can request the wireless credentials that assistant device 105 itself uses for access to the home's wireless network provided by router 110b. As a result, wireless network credentials 135 indicating the SSID and password of the wireless network provided by router 110b can be provided by assistant device 105 to camera 110a because it stores such information within configuration information 120. Camera 110a can then store wireless network credentials 135 in its own memory and update its configuration settings such that it can access the home's wireless network as provided by router 110b. Thus, camera 110a can receive configuration settings for the WLAN via the PAN and then access the WLAN based on the configuration settings.

In some implementations, because camera 110a has been set up, or installed, onto the home's wireless network, configuration settings for camera 110a can also be stored in configuration information 120 of assistant device 105. For example, camera information 130 can be generated indicating that camera 110a needs configuration settings regarding router 110b (e.g., wireless network credentials 135 stored as router information 125). Additionally, camera 110a might provide configuration settings for other devices to be able to use camera 110a. For example, assistant device 105 might store a username, password, network address, camera 110a type, camera 110a capabilities, or other types of information regarding camera 110a so that other devices can be set up to communicate with and use the resources of camera 110a if provided the corresponding configuration information. This configuration settings can be provided before or after camera 110a is provide the configuration settings to access the wireless network.

As a result, assistant device 105 can set up devices on a home's wireless network. Moreover, assistant device 105 can store information regarding the devices it sets up devices onto the home's wireless network such that other devices can be automatically set up to use other devices by being provided the configuration settings needed.

Sometimes, a device that was previously set up on a home's wireless network can lose its configuration settings, and therefore, need to be provided with configuration settings to reconnect with the wireless network. This can happen if a device loses power, physically resets, etc. In some implementations, the assistant device can manage the devices of a home by determining if devices are off the home's wireless network, and if so, provide the configuration information needed so that the devices can be operational to their prior state, for example, being able to reconnect with the wireless network.

Figure 2:
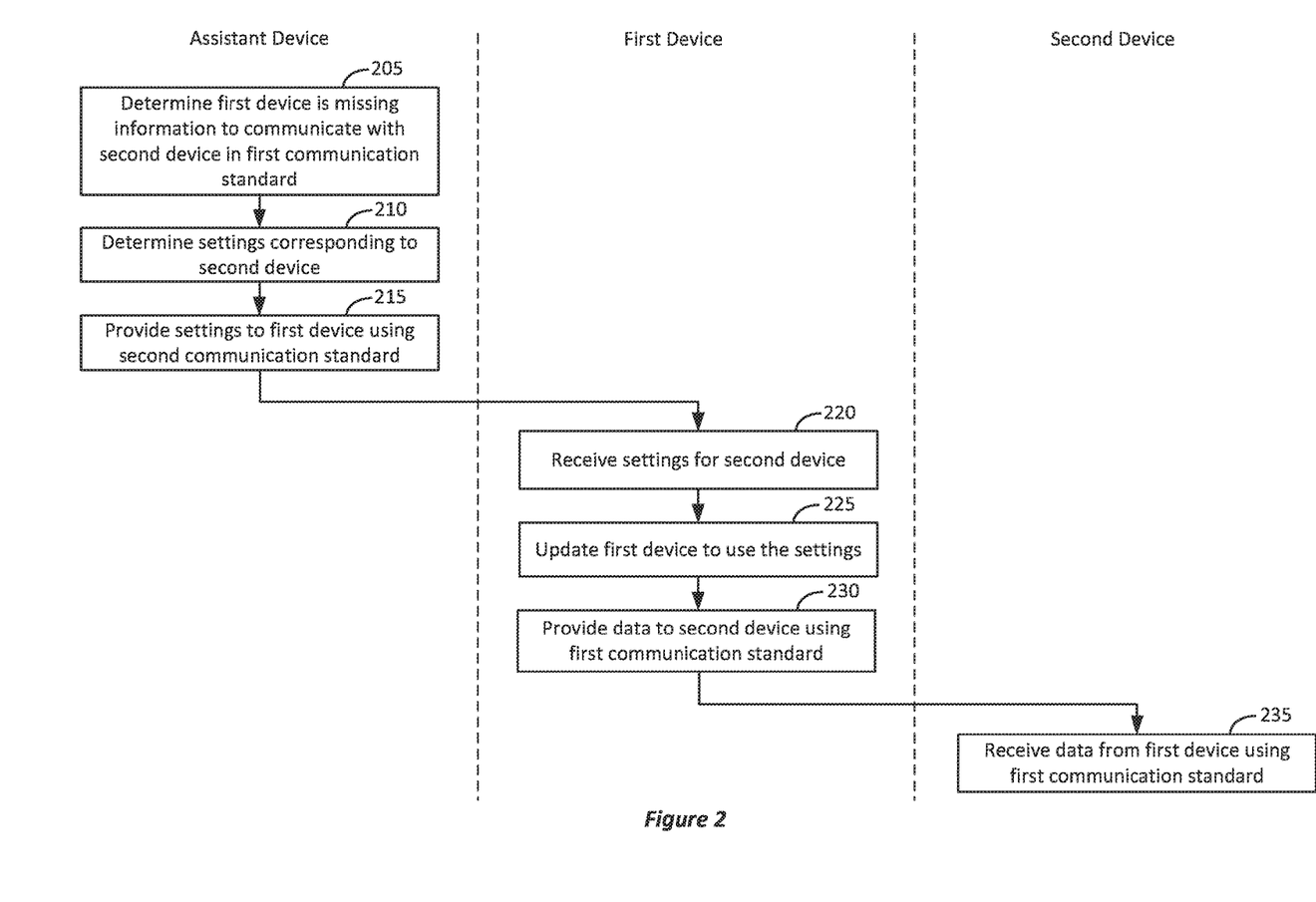
FIG. 2 illustrates an example of a block diagram for managing network devices.

FIG. 2 illustrates an example of a block diagram for managing network devices. In FIG. 2, at block 205, an assistant device can determine that a first home device is missing configuration settings. For example, because camera 110a in FIG. 1 was previously set up on the wireless network, assistant device 105 can communicate via the WLAN to check if camera 110a is properly configured. That is, assistant device 105 can attempt to communicate with camera 110a via a wireless communication standard corresponding to the home's wireless network. If assistant device 105 cannot communicate with camera 110a using that standard, then it can determine that it is not properly configured. In some implementations, assistant device 105 can attempt to communicate with camera 110a because it stores its network address or other type of contact information in camera information 130. In some implementations, assistant device 105 and camera 110a can communicate over the PAN communication channel to determine that camera 110a is missing the configuration settings. Camera 110a can alert assistant device 105 that it is missing the configuration settings, or assistant device 105 can contact camera 110a to request an update as to the status of its configuration settings.

At block 210, assistant device 210 can determine the configuration settings for the other device that camera 110a needs, for example, the configuration settings for router 110b. For example, because camera 110a was set up by assistant device 105 before, it can provide, in block 215, the same configuration settings, for example, wireless credentials 135 stored in configuration information 120 as router information 125. These configuration settings can be provided using the other communication standard, for example, the PAN communication standard that was initially used when camera 110a was provided the configuration settings for router 110b. This can be done because camera 110a can be unable to connect to the WLAN because it is missing the configuration settings that allow it to connect to the home's wireless network.

At block 220, camera 110a can receive the configuration settings. At block 225, camera 110a can update its configuration settings with the received configuration settings of router 110b. As a result, camera 110a can access the home's wireless network via the WLAN communication standard and provide data to router 110b in block 230. At block 235, router 110b can receive data from camera 110a, and therefore, camera 110a has been set back up to be operational within the home wireless network. Accordingly, assistant device 105 can set back up camera 110c using a secondary communication channel (e.g., using the PAN) so that it can access a primary communication channel (e.g., the WLAN provided by the home's wireless network or router 110b).

As previously discussed, assistant device 105 can be a smartphone. However, assistant device 105 can also be a tablet, smartwatch, or other mobile device. In some implementations, assistant device 105 can be a home device acting as a home automation hub, for example, also including speakers, microphones, display, etc. and including an artificial intelligence enabled home assistant.

Figure 3:
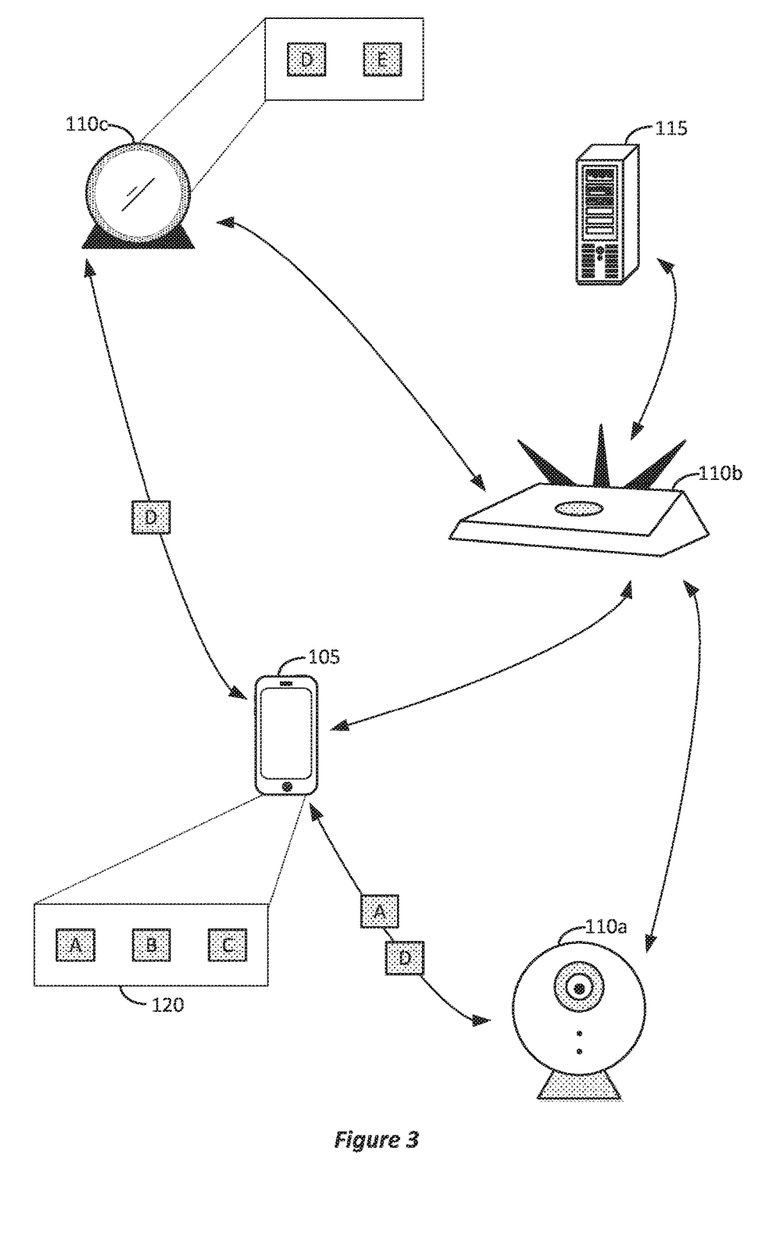
FIG. 3 illustrates an example of an assistant device providing configuration information to a network device using configuration information from another network device.

Some users might be uncomfortable storing configuration settings on a mobile device that can be taken outside of the home and lost. As a result, some configuration settings can be stored by assistant device 105, but some other configuration settings can be stored by another device on the home wireless network. FIG. 3 illustrates an example of an assistant device providing configuration information to a network device using configuration information from another network device.

In FIG. 3, home device 110c can be a home device as discussed above that can be expected to remain in the home, and therefore, can store some sensitive configuration settings that a user might not want stored on assistant device 105 that might be lost outside of the home environment. For example, configuration setting A of configuration information 120 stored on assistant device 105 can include the SSID of the home's wireless network. However, the user might not want the password to the wireless network to be available for other devices to receive from assistant device 105 unless it is within the home. As a result, home device 110c can store configuration setting D that can be the password to the wireless network. As such, when camera 110a is to be provided the wireless network credentials, assistant device 105 can request configuration setting D from home device 110a and then provide configuration settings A and D (i.e., the SSID and password, respectively) to camera 110a. Camera 110a can then connect to the home's wireless network.

Figure 4:
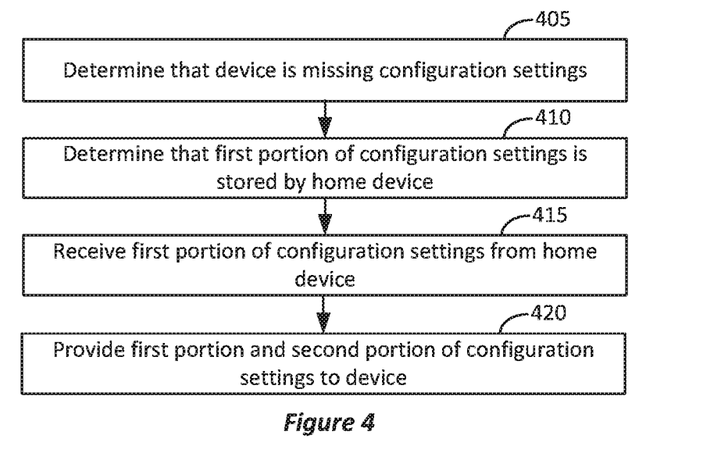
FIG. 4 illustrates an example of a block diagram for providing configuration information to a network device using configuration information from another network device

FIG. 4 illustrates an example of a block diagram for providing configuration information to a network device using configuration information from another network device. In FIG. 4, at block 405, an assistant device can determine that a device is missing configuration settings. For example, as depicted in FIG. 3, assistant device 105 can determine that camera 110a is not able to be contacted via the wireless network provided by router 110b (e.g., the WLAN) and, therefore, it is missing the configuration settings such as SSID or password to connect with the wireless network. In another example, assistant device 105 can communicate with camera 110a using a PAN to determine that camera 110a is not able to connect with the WLAN.

At block 410, the assistant device can determine that a first portion of the configuration settings is stored by a home device. For example, as depicted in FIG. 3, assistant device 105 can determine that camera 110a needs configuration settings A and D which can represent the credentials to use the WLAN. However, configuration settings 120 only includes configuration settings A, B, and C. Configuration settings D and E are stored by home device 110c. As a result, some of the configuration settings needed by camera 110a are stored by assistant device 105, but some of the other configuration settings needed by camera 110a are stored by home device 110c. As a result, assistant device 105 can request configuration setting D from home device 110c and, at block 415, receive that portion of the configuration settings. At block 420, the first portion and the second portion of the configuration settings can be provided to the device. For example, in FIG. 3, configuration settings A and D (i.e., the configuration setting received from home device 110c) can be provided to camera 110a so that it can access the WLAN. In some implementations, the configuration settings can be provided using the PAN, as previously discussed.

In some implementations, assistant device 105 can request to receive configuration setting D from home device 110c when it is communicatively coupled with it via the WLAN provided by the home's wireless network. For example, when assistant device 105 is brought into the home, it can request and receive configuration setting D and, therefore, store it so that it can be provided to other devices within the home. When assistant device 105 then determines that camera 110a needs configuration settings A and D, it can provide both configuration settings. When assistant device 105 leaves the home, it can then delete configuration setting D from its storage. For example, upon determining that it no longer detects the home's wireless network or that it can no longer communicate with home device 110c, assistant device 105 can delete configuration setting D. As a result, assistant device 105 can be able to provide configuration setting D as the user walks around the home, but when the user exits the home with assistant device 105, it can be removed to ensure the security and privacy expectations of the user.

Figure 5:
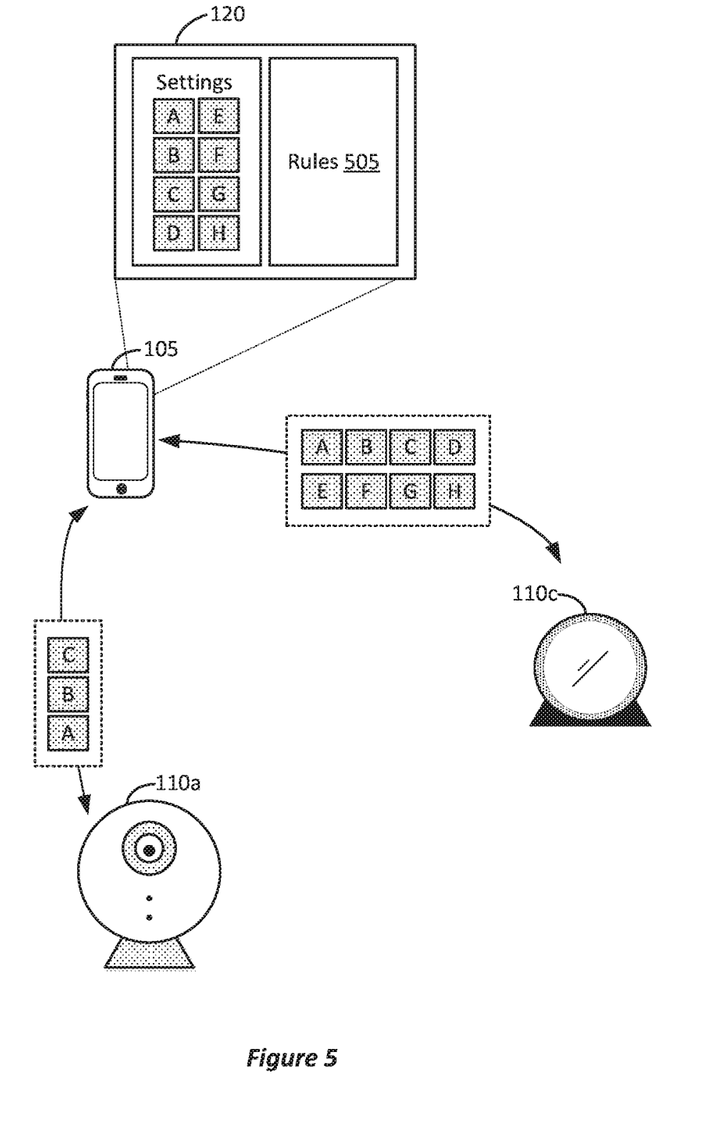
FIG. 5 illustrates an example of an assistant device using rules to configure network devices.

Some users might want to set up devices differently. FIG. 5 illustrates an example of an assistant device using rules to configure network devices. In FIG. 5, assistant device 105 includes configuration information 120 including both configuration settings and rules 505. The rules 505 can represent which configuration settings should be provided to certain devices based on characteristics of the devices. For example, the rules 505 can indicate that certain devices are more trusted than other devices, and therefore, the more trusted devices can be provided with more configuration settings than less trusted devices. In FIG. 5, this is represented by home device 110c being provided configuration settings A-H. By contrast, camera 110a can be provided fewer configuration settings A-C. This might occur because the rules indicate that a home-based device should be provided more configuration settings because it should be interfacing with several devices on the home wireless network so that it can function as a home automation hub. By contrast, camera 110a might be expected to connect with fewer devices, for example, merely just router 110b so that it can access the home's wireless network. Thus, the types of functionality that a device is expected to have or use can be used to determine a level of trust. In some implementations, a device can be provided a level of trust based on the type of device. For example, as discussed above, a home automation hub can be a type of device that might be considered to be more trustworthy than a camera. In some implementations, the trust can be based on the manufacturer of the device, when the device as manufactured, etc. The manufacturer of a device can be determined by receiving information from the devices indicating their manufacturer, receiving a unique identifier (e.g., media access control (MAC) address as representing a unique identification for a network interface card (NIC) of the device) and providing the unique identifier to a server to receive information regarding the manufacturer, etc. Thus, in one example, a device from one manufacturer might be provided more configuration settings than another device from another manufacturer.

In some implementations, the rules 505 can indicate that only a certain number of devices should be provided the configuration settings to another device. This might be done to ensure that a device is not bogged down with too many devices trying to access it. As a result, the configuration settings to that device might be restricted to a threshold number of devices. In some implementations, when the threshold number of devices is reached, a new device might not be provided the configuration settings. In another implementation, if it is determined that the new device has a higher priority to the configuration settings than another device currently using the configuration settings, then the assistant device can remove the configuration settings from the old device and provide the configuration settings to the new device. This allows for the threshold number of devices using the configuration settings to be maintained, but the devices within that threshold number of devices can be different over time.

In some implementations, sometimes many devices may need to be set up. In such scenarios, the rules can indicate a priority order for devices to be provided configuration settings. A device with a higher priority can be provided with its configuration information before a device with a lower priority. Thus, the devices can be connected to the home's wireless network in an orderly manner so as to not overwhelm the router with many overlapping or immediate requests to connect.

In some implementations, if a device is still missing configuration settings (i.e., either assistant device 105 does not have those configuration settings or the rules do not allow it to provide those configuration settings), then assistant device 105 can alert the user that the device is missing some configuration settings. For example, an alert can be provided on the display screen of assistant device 105. The user of assistant device 105 can then manually input the configuration settings and assistant device 105 can provide the configuration settings to the device needing to be set up.

In another example regarding characteristics of devices, rules 505 can indicate that devices within certain locations of the physical environment of the home's wireless network should be provided or excluded certain configuration settings. For example, assistant device 105 can determine that a device is within a bathroom (e.g., based on previously-recorded data input in by the user that the device is in the bathroom, using a camera internal or external to assistant device 105 to take a picture to provide an image frame providing an indication as to the location, etc.). Rules 505 might indicate that devices in the bathroom should not be provided Internet access, and, therefore, configuration settings to a router can be excluded from being provided to the device in the bathroom. However, configuration settings to a network attached storage (NAS) storing music can be provided. Thus, a subset of the configuration settings can be provided to a device based on its determined location within the physical space occupied by the home's wireless network. If a device within the bathroom is moved into the living room, then the device's location can be determined to have changed and the configuration settings previously excluded can now be provided. As a result, rules 505 can indicate that devices with particular characteristics such as location be provided some configuration settings, but devices with other characteristics such as being placed in another location be provided other configuration settings.

In some implementations, assistant device 105 can include a camera or have access to camera 110a. The camera can be used to generate an image frame portraying a device that needs to be set up and assistant device 105 can provide the configuration settings based on the image provided by the camera. For example, assistant device 105 can receive an image frame or a movie including several image frames of a device, determine characteristics of that device based on the image frame or image frames, and then provide configuration settings for that device based on its characteristics. For example, if assistant device 105 receives an image of a wireless speaker, it can determine that the object that should be configured is a wireless speaker (e.g., using image recognition) and that it needs the credentials to access the WLAN provided by a router because the router is the type of resource that a wireless speaker generally needs access to. Assistant device 105 can then provide those credentials via the PAN to the wireless speaker so that it can be set up using the WLAN. In another example, assistant device can provide the image to a server that can analyze the image and provide data back to assistant device 105 indicating characteristics of the device. In another example, assistant device 105 can include such functionality.

Assistant device 105 can also manage devices within the WLAN by withdrawing configuration settings from those devices. For example, some devices can be "knocked off" the network by instructing the devices to delete or remove configuration settings so that they can no longer access the WLAN (or another device). In one example, assistant device 105 can determine the bandwidth of the WLAN being used by a device. If that bandwidth is above a threshold bandwidth (e.g., determined to be too high) then assistant device can communicate with the device (either via the PAN or the WLAN) and instruct it to remove the configuration settings. The device can then delete the configuration settings such that it is no longer able to use the WLAN and, therefore, no longer using an excessive amount of the bandwidth of the WLAN. Thus, the characteristics of the usage of the WLAN can be determined and used to withdraw the configuration settings from a device.

In another example, assistant device 105 can determine whether a device that it has set up is in need of an update (e.g., a firmware update, software update, etc.). Because many updates provide new and important security features in response to cybersecurity threats, assistant device 105 can remove configuration settings of devices that need to be updated. For example, when assistant device 105 sets up a device on the WLAN by providing configuration settings, it can maintain a record of the date when it was set up and update that record to reflect when was the last time the device was updated. If assistant device 105 determines that an update is available (e.g., by querying a database, receiving information from a server, information from a home device, etc.) then it can look at the record and see if the device was updated. If not, assistant device 105 can withdraw the configuration settings for that device in a similar manner as discussed above. In some implementations, assistant device 105 can withdraw the configuration settings if the device has not applied the update (e.g., to update its security features) within a threshold time range (e.g., has not applied the update within one week of assistant device 105 being informed that such an update for the device is available). In some implementations, the priority order of the devices that are set up or provided configuration settings (as previously discussed) can be influenced by whether a device has been updated. Thus, a device that has been updated more recently can have a higher priority than a device that has not been updated recently. As a result, rules 505 can be updated so that the priority can reflect whether devices have been updated. This can allow devices that have been updated more recently to have access to more of other devices within the wireless network of the home, provided more configuration settings, etc.

In another example, assistant device 105 can receive utility information indicating utility usage of devices within the home and then provide or withdraw configuration settings based on the utility usage. For example, the electricity usage can be monitored by a device and assistant device 105 can receive electricity usage data from that device. If the electricity usage data indicates that too much electricity is being used (e.g., the amount of electricity being used exceeds a threshold number), then assistant device 105 can withdraw configuration settings of devices until the electricity usage data indicates that the electricity being used is now at or beneath the threshold number. In another example, assistant device 105 can provide configuration settings as long as the electricity usage is at or beneath the threshold number.

In some implementations, router 110b can provide two WLANs, for example, one at the 2.4 gigahertz (GHz) band and a second at the 5 GHz band. These different WLANs might have use different wireless credentials and, therefore, assistant device 105 can provide those different wireless credentials to devices. For example, one device might be provided the credentials for the 2.4 GHz WLAN and a second device might be provided the credentials for the 5 GHz WLAN. In some implementations, devices that represent a higher security risk (e.g., older devices, devices that have not been updated recently, less trusted devices, etc.) can be provided the credentials to one WLAN but other devices that represent a lower security risk (e.g., newer devices, devices that have been updated recently) can be provided the credentials to the other WLAN. Thus, one WLAN might be used by more secure devices while another WLAN can be used by devices that might have some potential for security problems. This can isolate potential problems to one WLAN while allowing the other WLAN to have a reduced risk to security threats.

In some implementations, multiple assistant devices can be set up in the home. Any missing configuration settings stored by one assistant device can be provided by another assistant device. That is, the different assistant devices might store different subsets of the configuration settings for the devices in the home and these configuration settings can be passed from one assistant device to another assistant device.

Many of the aforementioned examples discuss a wireless network in a home. In other examples, the wireless network may be set up in an office or other place. Many of the aforementioned examples also discuss wireless credentials to access a wireless network. In other examples, other types of configuration settings or credentials can be provided. Additionally, many of the examples discussed above involve certain wireless standards. Other wireless standards such as OpenThread can also be used.

Figure 6:
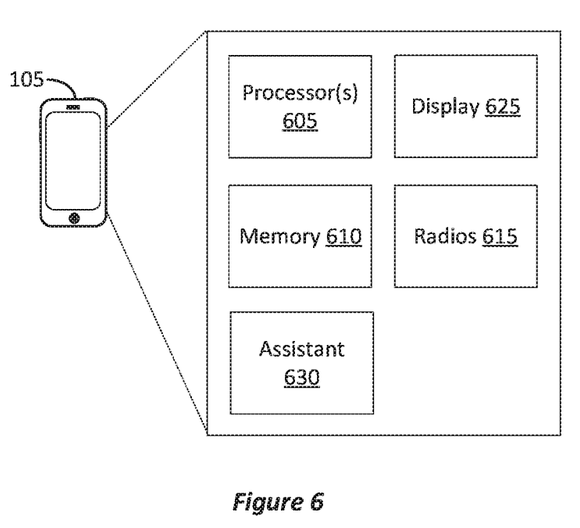
FIG. 6 illustrates an example of a block diagram for using rules to configure network devices.

In FIG. 6, assistant device 105 includes a processor 605, memory 610, touchscreen display 625, radios 615, as well as other types of hardware such as non-volatile memory, an interface device, camera, microphones, speakers, etc. to implement assistant logic 630 providing the techniques disclosed herein. Various common components (e.g., cache memory) are omitted for illustrative simplicity. The assistant device is intended to illustrate a hardware device on which any of the components described in the example of FIGS. 1-5 (and any other components described in this specification) can be implemented. The components of the assistant device can be coupled together via a bus or through some other known or convenient device.

The processor 605 may be, for example, a microprocessor circuit such as an Intel Pentium microprocessor or Motorola power PC microprocessor. One of skill in the relevant art will recognize that the terms "machine-readable (storage) medium" or "computer-readable (storage) medium" include any type of device that is accessible by the processor. Processor 605 can also be circuitry such as an application specific integrated circuits (ASICs), complex programmable logic devices (CPLDs), field programmable gate arrays (FPGAs), structured ASICs, etc.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk; a magnetic-optical disk; an optical disk; a read-only memory (ROM) such as a CD-ROM, EPROM, or EEPROM; a magnetic or optical card; or another form of storage for large amounts of data. Some of this data is often written, by a direct memory access process, into memory during the execution of software in the computer. The non-volatile storage can be local, remote or distributed. The non-volatile memory is optional because systems can be created with all applicable data available in memory. A typical computer system will usually include at least a processor, memory, and a device (e.g., a bus) coupling the memory to the processor.

The software can be stored in the non-volatile memory and/or the drive unit. Indeed, storing an entire large program in memory may not even be possible. Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program is can be stored at any known or convenient location (from non-volatile storage to hardware registers).

The bus also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as "processing" or "computing" or "calculating" or "determining" or "displaying" or "generating" or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. An electronic device, comprising:
one or more processors; and
memory storing instructions, wherein the processor is configured to execute the instructions such that the processor and memory are configured to:
determine that a device is missing configuration settings to use a first wireless network implemented using a first protocol, the determination based on communicating with the first device using a second wireless network implemented using a second protocol, the first protocol being a wireless local area network (WLAN) protocol, the second protocol being a personal area network (PAN) protocol;
determine the configuration settings for the device to use the first wireless network, the configuration settings including authentication credentials of the first wireless network; and
provide the configuration settings including the authentication credentials to the first wireless network implemented using the WLAN protocol to the device using the second wireless network implemented using the PAN protocol;
wherein the processor is configured to execute the instructions such that the processor and memory are configured to: receive an image frame portraying the device, wherein the determination that the device is missing configuration settings is based on the device being portrayed in the image frame.

2. An electronic device, comprising:
one or more processors; and
memory storing instructions, wherein the processor is configured to execute the instructions such that the processor and memory are configured to:
determine that a first device is missing configuration settings to use a first wireless network implemented using a first protocol, the determination based on communicating with the first device using a second wireless network implemented using a second protocol, the first protocol and the second protocol being different, wherein the second wireless network is provided by the first device, a range of the second wireless network being smaller than a range of the first wireless network;
determine the configuration settings for the first device to use the first wireless network;
provide the configuration settings regarding the first wireless network implemented using the first protocol to the first device using the second wireless network implemented using the second protocol; and
receive an image frame portraying the first device, wherein the determination that the first device is missing configuration settings is based on the first device being portrayed in the image frame.

3. The electronic device of claim 2, wherein one of the first protocol or the second protocol is a wireless local area network (WLAN) protocol, and the other is a personal area network (PAN) protocol.

4. The electronic device of claim 3, wherein the first protocol is the WLAN protocol, and the second protocol is the PAN protocol.

5. The electronic device of claim 2, wherein the configuration settings include authentication credentials of the first wireless network.

6. The electronic device of claim 2, wherein the processor is configured to execute the instructions such that the processor and memory are configured to:
determine first characteristics representative of the first device;
determine second characteristics representative of a second device, the first characteristics and the second characteristics being different; and
provide different configuration settings to the second device than the configuration settings provided to the first device based on the differences between the first characteristics and the second characteristics.

7. A method for managing devices on a wireless network, comprising:
determining, by a processor, that a first device is missing configuration settings to use a first wireless network implemented using a first protocol, the determination based on communicating with the first device using a second wireless network implemented using a second protocol, the first protocol and the second protocol being different, wherein the second wireless network is provided by the first device, a range of the second wireless network being smaller than a range of the first wireless network;

determining the configuration settings for the first device to use the first wireless network;

providing the configuration settings regarding the first wireless network implemented using the first protocol to the first device using the second wireless network implemented using the second protocol; and receiving an image frame portraying the first device, wherein the determination that the first device is missing configuration settings is based on the first device being portrayed in the image frame.

8. The method of claim 7, wherein one of the first protocol or the second protocol is a wireless local area network (WLAN) protocol, and the other is a personal area network (PAN) protocol.

9. The method of claim 8, wherein the first protocol is the WLAN protocol, and the second protocol is the PAN protocol.

10. The method of claim 7, wherein the configuration settings include authentication credentials of the first wireless network.

11. The method of claim 7, further comprising steps to:
determine first characteristics representative of the first device;
determine second characteristics representative of a second device, the first characteristics and the second characteristics being different; and
provide different configuration settings to the second device than the configuration settings provided to the first device based on the differences between the first characteristics and the second characteristics.

12. A computer program product, comprising one or more non-transitory computer-readable media having computer program instructions stored therein, the computer program instructions being configured such that, when executed by one or more computing devices, the computer program instructions cause the one or more computing devices to:

determine that a first device is missing configuration settings to use a first wireless network implemented using a first protocol, the determination based on communicating with the first device using a second wireless network implemented using a second protocol, the first protocol and the second protocol being different, wherein the second wireless network is provided by the first device, a range of the second wireless network being smaller than a range of the first wireless network;

determine the configuration information for the first device to use the first wireless network;

provide the configuration settings regarding the first wireless network implemented using the first protocol to the first device using the second wireless network implemented using the second protocol; and receive an image frame portraying the device, wherein the determination that the device is missing configuration settings is based on the device being portrayed in the image frame.

13. The computer program product of claim 12, wherein one of the first protocol or the second protocol is a wireless local area network (WLAN) protocol, and the other is a personal area network (PAN) protocol.

14. The computer program product of claim 13, wherein the first protocol is the WLAN protocol, and the second protocol is the PAN protocol.

15. The computer program product of claim 12, wherein the configuration settings includes authentication credentials of the first wireless network.

16. The computer program product of claim 12, wherein the computer program instructions cause the one or more computing devices to:
determine first characteristics representative of the first device;
determine second characteristics representative of a second device, the first characteristics and the second characteristics being different; and
provide different configuration settings to the second device than the configuration settings provided to the first device based on the differences between the first characteristics and the second characteristics.

\* \* \* \* \*